US012417708B2

(12) United States Patent
Matsuki et al.

(10) Patent No.: US 12,417,708 B2
(45) Date of Patent: Sep. 16, 2025

(54) FLIGHT MANAGEMENT APPARATUS AND FLIGHT MANAGEMENT METHOD

(71) Applicant: KDDI CORPORATION, Tokyo (JP)

(72) Inventors: Tomoaki Matsuki, Tokyo (JP); Masayuki Tachiiwa, Tokyo (JP); Hiroshi Kawana, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 453 days.

(21) Appl. No.: 17/412,838

(22) Filed: Aug. 26, 2021

(65) Prior Publication Data

US 2022/0215763 A1 Jul. 7, 2022

(30) Foreign Application Priority Data

Jan. 6, 2021 (JP) ................................ 2021-000738

(51) Int. Cl.
*G08G 5/55* (2025.01)
*G08G 5/22* (2025.01)
(Continued)

(52) U.S. Cl.
CPC ................ *G08G 5/55* (2025.01); *G08G 5/22* (2025.01); *G08G 5/32* (2025.01); *G08G 5/57* (2025.01)

(58) Field of Classification Search
None
See application file for complete search history.

(56) References Cited

U.S. PATENT DOCUMENTS 11,657,720 B2 * 5/2023 Takács ................ H04W 28/021 370/254
2012/0158219 A1 * 6/2012 Durling .................. G08G 5/045 701/4
(Continued)

FOREIGN PATENT DOCUMENTS

JP 2008-105591 A 5/2008
JP 2017-147718 A 8/2017
(Continued)

OTHER PUBLICATIONS

Office Action issued in corresponding Japanese Patent Application No. 2021-079200 dated Jul. 13, 2021.

*Primary Examiner* — Aniss Chad
*Assistant Examiner* — Madison R. Inserra
(74) *Attorney, Agent, or Firm* — Foley & Lardner LLP

(57) ABSTRACT

A flight management apparatus includes a reception unit that receives, from a user's terminal, flight schedule information including user identification information for identifying the user, a flight path or a flight range in which a flight apparatus is scheduled to fly, and a flight schedule period in which the flight apparatus is scheduled to fly, an aircraft identification unit that identifies aircraft information related to the flight apparatus and associated with the user identification information, a carrier identification unit that identifies a communication carrier providing a communication service available to the flight apparatus on the basis of the aircraft information, a determination unit that determines whether the flight apparatus is communicable during flight using the communication service on the basis of the communication carrier and the flight path or the flight range, and a transmission unit that transmits a determination result to the user's terminal.

12 Claims, 7 Drawing Sheets

(51) Int. Cl.

| | |
|---|---|
| ***G08G 5/32*** | (2025.01) |
| ***G08G 5/57*** | (2025.01) |
| *G08G 5/20* | (2025.01) |
| *G08G 5/21* | (2025.01) |
| *G08G 5/26* | (2025.01) |
| *G08G 5/59* | (2025.01) |
| *H04W 4/40* | (2018.01) |

(56) References Cited

U.S. PATENT DOCUMENTS

| | | | | |
|---|---|---|---|---|
| 2018/0253978 | A1* | 9/2018 | Tabuchi ............... | G08G 5/0069 |
| 2019/0340933 | A1* | 11/2019 | Villa .................... | G06Q 10/047 |
| 2020/0008079 | A1* | 1/2020 | Halsey ................. | G08G 5/0039 |
| 2020/0317335 | A1 | 10/2020 | Sugaya | |
| 2020/0365039 | A1* | 11/2020 | Yamada ............... | G08G 5/0052 |
| 2022/0301444 | A1* | 9/2022 | Jalkanen .............. | G05D 1/0022 |

FOREIGN PATENT DOCUMENTS

| | | | | |
|---|---|---|---|---|
| JP | 2019-071612 | A | | 5/2019 |
| JP | 2020-076787 | A | | 5/2020 |
| JP | 2020176995 | A | * | 10/2020 |
| WO | WO-2018/198313 | A1 | | 11/2018 |
| WO | WO-2020/020460 | A1 | | 1/2020 |

* cited by examiner

FIG. 4A

| USER ID | AIRCRAFT ID | SIM INFORMATION |
|---|---|---|
| U001 | AIRCRAFT α | SIM OF COMPANY A |
| U001 | AIRCRAFT β | SIM OF COMPANY A |
| U001 | AIRCRAFT β | SIM OF COMPANY B |
| U002 | AIRCRAFT γ | eSIM |

FIG. 4B

| SIM INFORMATION | COMMUNICATION CARRIER |
|---|---|
| SIM OF COMPANY A | COMPANY A |
| SIM OF COMPANY B | COMPANY B |
| eSIM | COMPANY A AND COMPANY B |

FLIGHT MANAGEMENT APPARATUS AND FLIGHT MANAGEMENT METHOD

CROSS-REFERENCE TO RELATED APPLICATION

Priority is claimed on Japanese Patent Application No. 2021-000738, filed on Jan. 6, 2021, the content of which is incorporated herein by reference.

BACKGROUND OF THE INVENTION

Field of the Invention

The present invention relates to a flight management apparatus and a flight management method for managing information related to flight of a flight apparatus.

Description of Related Art

PCT International Publication No. WO 2018/198313 (hereinafter referred to as "Patent Document 1") discloses a system that receives an input of an area of flight of a flight apparatus such as a drone and a purpose of flight, creates a flight path depending on the received area and the purpose, and controls the flight of the flight apparatus in accordance with the created flight path.

SUMMARY OF THE INVENTION

In order to control flight of a drone in a wide region, use of a drone that performs communication using predetermined radio waves of a mobile communication network or the like has been reviewed. However, an area in which communication can be performed using radio waves varies for each communication carrier (communication provider) that provides a communication service. Thus, communication may be disconnected or communication may be unstable during flight depending on locations in which the drone flies.

Therefore, the present invention is conceived in view of such circumstances, and an object thereof is to enable a flight apparatus to perform stable communication on a flight path or in a flight range designated by a user using a communication service provided by a communication carrier.

A flight management apparatus of a first aspect of the present invention includes a reception unit that receives, from a user terminal used by a user, flight schedule information including user identification information for identifying the user, a flight path or a flight range in which a flight apparatus is scheduled to fly, and a flight schedule period in which the flight apparatus is scheduled to fly on the flight path or in the flight range; an aircraft identification unit that identifies aircraft information related to the flight apparatus, the aircraft information being associated with the user identification information; a carrier identification unit that identifies a communication carrier which provides a communication service available to the flight apparatus on the basis of the aircraft information; a determination unit that determines whether or not the flight apparatus is communicable during flight on the flight path or in the flight range using the communication service on the basis of the communication carrier and the flight path or the flight range; and a transmission unit that transmits a determination result of the determination unit to the user terminal.

The reception unit may receive a reservation request for flight of the flight apparatus in accordance with the flight schedule information from the user terminal, and the flight management apparatus may further include a reservation management unit that, in a case in which the reception unit receives the reservation request, associates and stores the flight schedule information, the aircraft information, and communication carrier information indicating the communication carrier in a storage unit.

The determination unit may determine that the flight apparatus is flyable on the flight path or in the flight range in a case in which the flight path or the flight range is included in a communication area of the communication service, and determine that the flight apparatus is not flyable on the flight path or in the flight range in a case in which the flight path or the flight range is not included in the communication area.

In a case in which the carrier identification unit identifies a plurality of communication carriers, the determination unit may determine whether or not the flight apparatus is communicable during the flight on the flight path or in the flight range for each of the plurality of communication carriers on the basis of the communication carrier and the flight path or the flight range.

In a case in which the carrier identification unit identifies a plurality of communication carriers, the determination unit may determine whether or not the flight apparatus is communicable during the flight on the flight path or in the flight range on the basis of a combination of two or more communication carriers among the plurality of communication carriers and the flight path or the flight range.

The reception unit may receive, from the user terminal, the flight schedule information including the number of aircrafts of a plurality of the flight apparatuses that are scheduled to fly on the flight path or in the flight range, and the transmission unit may transmit, to the user terminal, the aircraft information about a plurality of the flight apparatuses that correspond to the number of the aircrafts and that are determined to be flyable on the flight path or in the flight range by the determination unit.

The reception unit may receive the flight schedule information including a plurality of flight paths or a plurality of flight ranges from the user terminal, and the transmission unit may transmit, to the user terminal, the aircraft information about the flight apparatus that is determined to be flyable on the flight path or in the flight range by the determination unit for each of the plurality of flight paths or the plurality of flight ranges.

The reception unit may receive, from the user terminal, the flight schedule information including a work content to be performed on the flight path or in the flight range by the flight apparatus, and the determination unit may determine whether or not the flight apparatus is communicable during the flight on the flight path or in the flight range on the basis of the work content in addition to the communication carrier and the flight path or the flight range.

A flight management method of a second aspect of the present invention is a flight management method executed by a processor and includes: receiving, from a user terminal used by a user, flight schedule information including user identification information for identifying the user, a flight path or a flight range in which a flight apparatus is scheduled to fly, and a flight schedule period in which the flight apparatus is scheduled to fly on the flight path or in the flight range; identifying aircraft information related to the flight apparatus, the aircraft information being associated with the user identification information; identifying a communication carrier which provides a communication service available to communication by the flight apparatus on the basis of the aircraft information; performing a determination as to whether or not the flight apparatus is communicable during flight on the flight path or in the flight range using the communication service on the basis of the communication carrier and the flight path or the flight range; and transmitting a result of the determination to the user terminal.

According to the present invention, an advantageous effect of enabling a flight apparatus to perform stable communication on a flight path or in a flight range designated by a user using a communication service provided by a communication carrier is achieved.

BRIEF DESCRIPTION OF THE DRAWINGS

FIG. 4A is an exemplary schematic diagram of aircraft information.

FIG. 4B is an exemplary schematic diagram of communication carrier information.

DETAILED DESCRIPTION OF THE INVENTION

Summary of Flight Management System

Figure 1:
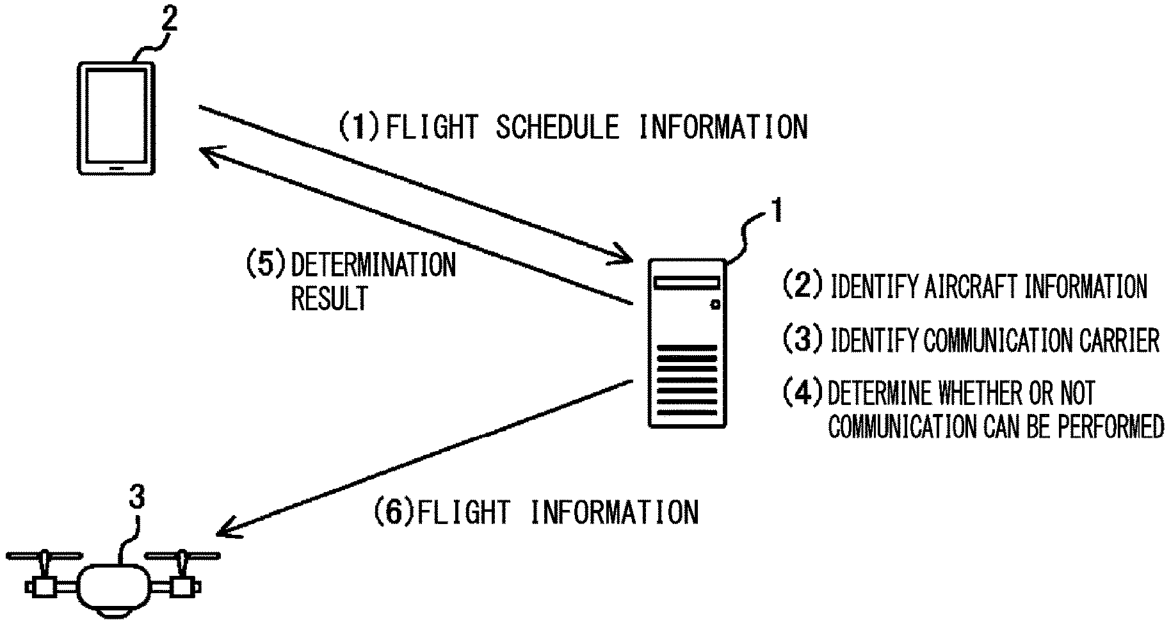
FIG. 1 is a schematic diagram of a flight management system according to an embodiment.

FIG. 1 is a schematic diagram of a flight management system according to the present embodiment. The flight management system includes a flight management apparatus 1, a user terminal 2, and a flight apparatus 3. The flight management system may include other terminals, other apparatuses, and the like.

The flight management apparatus 1 is a computer that receives flight schedule information related to flight of the flight apparatus 3 from the user terminal 2 and determines whether or not the flight apparatus can perform communication during the flight using a communication service provided by a communication carrier. The flight management apparatus 1 is a single apparatus or includes a plurality of apparatuses. In addition, the flight management apparatus 1 may be one or a plurality of virtual servers that operate on a cloud which is a set of computer resources.

The user terminal 2 is a computer used by a user. The user terminal 2 is, for example, an information terminal such as a smartphone, a tablet terminal, or a personal computer. The user is, for example, a person who operates, manages, or possesses the flight apparatus 3. The user terminal 2 includes a display unit such as a liquid crystal display for displaying information and an operation unit such as a touch panel for receiving an operation performed by the user. The user terminal 2 transmits and receives information to and from the flight management apparatus 1 by communication.

The flight apparatus 3 is an unmanned flight apparatus such as a drone that flies on a flight path or in a flight range designated by the user and performs a predetermined work. The work performed by the flight apparatus 3 is, for example, transport of an object on the flight path or in the flight range, imaging around the flight path or the flight range, release of an object (agrochemical or the like) on the flight path or in the flight range, or output of information (voice, light, or the like) on the flight path or in the flight range. During the flight, the flight apparatus 3 performs communication using the communication service provided by the communication carrier (also referred to as a communication provider).

Hereinafter, a summary of processing executed by the flight management apparatus 1 according to the present embodiment will be described. The flight management apparatus 1 receives, from the user terminal 2, flight schedule information including user identification information for identifying the user, the flight path or the flight range in which the flight apparatus 3 is scheduled to fly, and a flight schedule period in which the flight apparatus 3 is scheduled to fly on the flight path or in the flight range ((1) in FIG. 1).

The flight management apparatus 1 identifies aircraft information related to the flight apparatus 3 that can fly by the user ((2) in FIG. 1), wherein the aircraft information is associated with the received user identification information. For example, the aircraft information includes the user identification information, aircraft identification information for identifying an aircraft of the flight apparatus 3, and subscriber identity module (SIM) information indicating a SIM that is a communication facility included in the flight apparatus 3.

The flight management apparatus 1 identifies the communication carrier that provides the communication service that are available to the flight apparatus 3 on the basis of the identified aircraft information ((3) in FIG. 1). The flight management apparatus 1 determines whether or not the flight apparatus 3 can perform communication using the communication service of the communication carrier during the flight on the flight path or in the flight range on the basis of the identified communication carrier and the received flight path or the received flight range ((4) in FIG. 1). For example, in a case in which at least part of the flight path or the flight range is not included in a communication area of the communication service of the communication carrier, the flight management apparatus 1 may determine that communication cannot be performed. In addition, for example, in a case in which a value that indicates communication quality of communication using the communication service of the communication carrier is a predetermined reference value or less in at least part of the flight path or the flight range (a case in which radio waves are weak, a case in which there is interference of radio waves, or the like), the flight management apparatus 1 may determine that communication cannot be performed.

The flight management apparatus 1 transmits a determination result as to whether or not the flight apparatus 3 can perform communication during the flight on the flight path or in the flight range to the user terminal 2 ((5) in FIG. 1). In addition, the flight management apparatus 1 transmits flight information for causing the flight apparatus 3 to fly on the flight path or in the flight range to the flight apparatus 3 corresponding to the identified aircraft information, on a condition that it is determined that the flight apparatus 3 can fly on the flight path or in the flight range using the communication service of the communication carrier ((6) in FIG. 1). The flight apparatus 3 performs communication during the flight on the flight path or in the flight range using the communication service of the communication carrier identified by the flight management apparatus 1.

In such a manner, the flight management apparatus 1 according to the present embodiment identifies the communication carrier that provides the communication service available to the flight apparatus 3, determines whether or not the flight apparatus 3 can perform communication during the flight on the flight path or in the flight range using the communication service of the communication carrier, and transmits the determination result to the user terminal 2. The user can refer to the determination result in the user terminal 2 and then decide whether or not to actually cause the flight apparatus 3 to fly. Accordingly, the flight management apparatus 1 can cause the flight apparatus 3 to perform stable communication on the flight path or in the flight range designated by the user using the communication service provided by the communication carrier.

Configuration of Flight Management Apparatus 1

Figure 2:
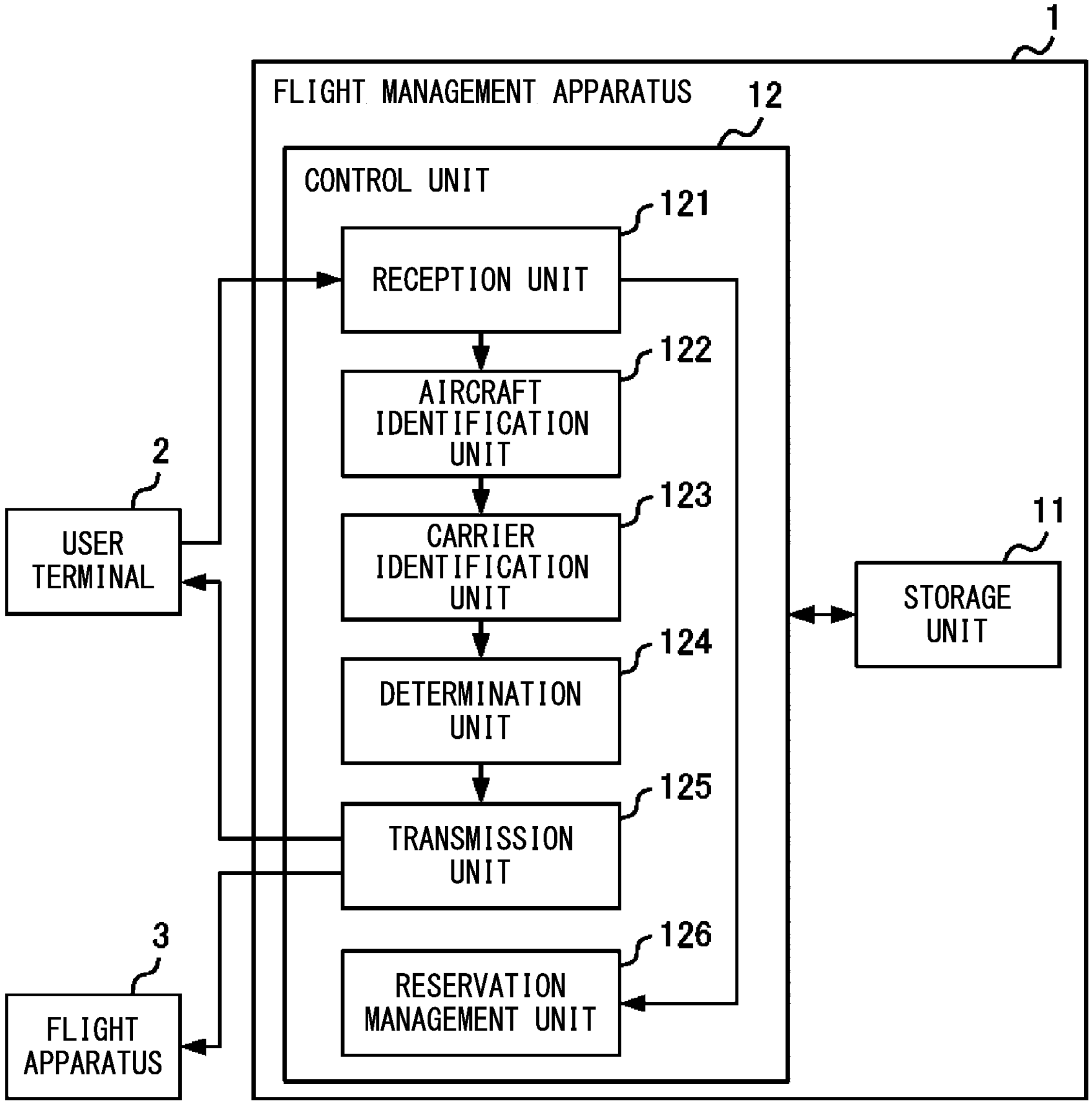
FIG. 2 is a block diagram of a flight management apparatus according to the embodiment.

FIG. 2 is a block diagram of the flight management apparatus 1 according to the present embodiment. In FIG. 2, arrows indicate the main flow of data, and a flow of data other than shown in FIG. 2 may be present. In FIG. 2, each block indicates a configuration in functional units and does not indicate a configuration in hardware (apparatus) units. Thus, the blocks shown in FIG. 2 may be implemented in a single apparatus or may be separately implemented in a plurality of apparatuses. Exchange of data between the blocks may be performed through any means such as a data bus, a network, or a portable storage medium.

The flight management apparatus 1 includes a storage unit 11 and a control unit 12. The storage unit 11 is a storage medium including a read only memory (ROM), a random access memory (RAM), a hard disk drive, and the like. The storage unit 11 stores in advance a program to be executed by the control unit 12. In addition, the storage unit 11 stores the aircraft information related to the flight apparatus 3 that is caused to fly by the user, communication carrier information related to the communication carrier that provides the communication service available to the flight apparatus 3, communication area information that indicates the communication area in which communication can be performed using the communication service provided by the communication carrier, and reservation information related to a reservation situation of the flight apparatus 3.

The communication area information may include a communication area estimated by a simulator, may include a communication area created on the basis of communication quality information measured by the actual flight of the flight apparatus, and may include a communication area obtained by combining these communication areas. In addition, the communication area information may include a value (e.g., a signal-to-noise ratio (SNR) or intensity of radio waves) of the communication quality at each point of one or each of a plurality of communication carriers.

The control unit 12 includes a reception unit 121, an aircraft identification unit 122, a carrier identification unit 123, a determination unit 124, a transmission unit 125, and a reservation management unit 126. The control unit 12 is a processor such as a central processing unit (CPU) and functions as the reception unit 121, the aircraft identification unit 122, the carrier identification unit 123, the determination unit 124, the transmission unit 125, and the reservation management unit 126 by executing the program stored in the storage unit 11. Each unit of the control unit 12 may be separately implemented in a plurality of apparatuses constituting the flight management apparatus 1.

Hereinafter, a configuration for executing processing according to the present embodiment by the flight management apparatus 1 will be described. The reception unit 121 receives, from the user terminal 2, the flight schedule information including the user identification information (hereinafter referred to as a user ID) for identifying the user, the flight path or the flight range in which the flight apparatus 3 is scheduled to fly, and the flight schedule period in which the flight apparatus 3 is scheduled to fly on the flight path or in the flight range.

Figure 3:
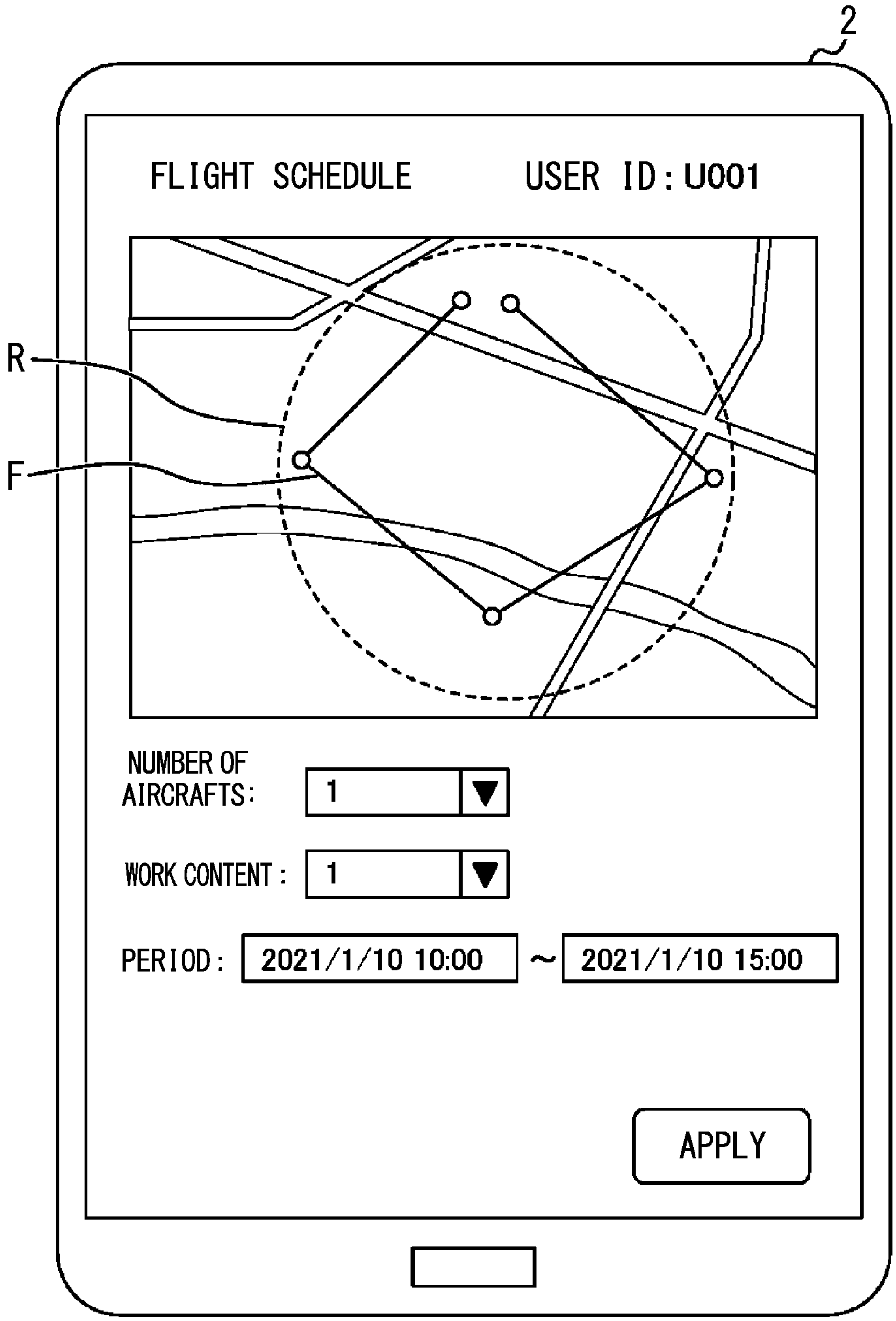
FIG. 3 is a schematic diagram of a flight schedule screen for receiving an input of flight schedule information in a user terminal.

FIG. 3 is a schematic diagram of a flight schedule screen for receiving an input of the flight schedule information in the user terminal 2. The user terminal 2 displays the flight schedule screen on the display unit on the basis of a trigger that the user logs in to the flight management apparatus 1 using the user ID.

For example, the user terminal 2 receives a planar range designated on a map displayed on the flight schedule screen as a flight range R. In addition, the user terminal 2 receives a linear path designated in the flight range R on the map displayed on the flight schedule screen as a flight path F. In addition, the user terminal 2 may receive a designation of only one of the flight path F and the flight range R. In addition, the user terminal 2 may receive a designation of the flight path F or the flight range R in three dimensions including a position and an altitude.

Specifically, first, the user terminal 2 receives a creation of a flight area that is a flyable region, on the map. The flight management apparatus 1 stores the created flight area in the storage unit 11 as the flight range R in association with the user identification information for identifying the user of the user terminal 2. Then, the user terminal 2 receives a designation of the flight path F in the flight range R.

In addition, the user terminal 2 receives, on the flight schedule screen, a designation of the number of aircrafts of one or a plurality of flight apparatuses 3 that fly on the flight path F or in the flight range R, a work content to be performed by the flight apparatus 3 on the flight path F or in the flight range R, and the flight schedule period in which the flight apparatus 3 flies. The flight schedule period is, for example, a period that is designated as a start date and time and an end date and time. The user terminal 2 may receive an input of other information.

In the flight management apparatus 1, the reception unit 121 receives, from the user terminal 2, the flight schedule information including the user ID of the user who uses the user terminal 2, and information input in the user terminal 2. The reception unit 121 stores the flight schedule information received from the user terminal 2 in the storage unit 11.

The aircraft identification unit 122 identifies the aircraft information associated with the user ID included in the flight schedule information received by the reception unit 121. FIG. 4A is an exemplary schematic diagram of the aircraft information. The flight management apparatus 1 stores in advance the aircraft information related to one or a plurality of flight apparatuses 3 for which the user has a permission to fly by possession or rental, in the storage unit 11 on the basis of the input provided by the user.

For example, the aircraft information is information in which the user ID of the user, flight apparatus identification information (hereinafter, an aircraft ID) for identifying the aircraft of the flight apparatus 3 that can fly by the user, and the SIM information indicating the SIM that is the communication facility included in the flight apparatus 3 are associated.

The SIM information is information for identifying the communication facility included in the flight apparatus 3. For example, the communication facility included in the flight apparatus 3 is a SIM (a SIM of company A and a SIM of company B in FIG. 4A) with which the communication service of one communication carrier is available, or a SIM (an embedded-SIM (eSIM) in FIG. 4A) with which communication services of a plurality of communication carriers are available. The communication service of the communication carrier available to the eSIM is changed by setting predetermined information using well-known setting processing.

One user ID may be associated with a plurality of aircraft IDs. In addition, one aircraft ID may be associated with a plurality of pieces of SIM information. That is, the aircraft information indicates one or a plurality of flight apparatuses 3 that can fly by the user, and one or a plurality of communication facilities mounted for communication of the flight apparatus 3. The aircraft information may include other information related to the flight apparatus 3, such as the flight speed, the standby position, the size, the weight, the charging method, and the functions of the flight apparatus 3.

The aircraft identification unit 122 identifies, from the aircraft information stored in the storage unit 11, one or a plurality of pieces of aircraft information associated with the user ID included in the flight schedule information received by the reception unit 121. Accordingly, one or the plurality of flight apparatuses 3 that can fly by the user are extracted.

In addition, the aircraft identification unit 122 may select, from the aircraft information associated with the user ID included in the flight schedule information received by the reception unit 121, the aircraft information about the flight apparatus 3 that can fly by moving from the standby position to the flight path or the flight range and then return to the standby position within the flight schedule period on the basis of the standby position and the flight speed of the flight apparatus 3. For example, the standby position is the take-off and landing location closest to the flight apparatus 3 or a current position of the flight apparatus 3 acquired by remotely requesting the current position from the flight apparatus 3 by the flight management apparatus 1. In addition, the aircraft identification unit 122 may acquire the reservation situation of the flight apparatus 3 from the storage unit 11 and select the aircraft information about the flight apparatus 3 not reserved in the flight schedule period.

The carrier identification unit 12 identifies the communication carrier that provides the communication service available to the flight apparatus 3 on the basis of the aircraft information identified by the aircraft identification unit 122. FIG. 4B is an exemplary schematic diagram of the communication carrier information. The flight management apparatus 1 stores, in advance in the storage unit 11, the communication carrier information related to one or a plurality of communication carriers corresponding to a SIM that may be mounted on the flight apparatus 3 on the basis of an input provided by a manager of the flight management apparatus 1.

For example, the communication carrier information is information in which the SIM information is associated with the communication carrier that provides the available communication service by using the communication facility indicated by the SIM information. In a case in which the communication services of the plurality of communication carriers are available to the SIM corresponding to the SIM information, the plurality of communication carriers are associated with the SIM information. The communication carrier information may include other information related to the SIM and the communication carrier, such as a usage fee for each communication carrier.

The carrier identification unit 123 acquires, from the communication carrier information stored in the storage unit 11, the communication carrier information that is associated with the SIM information included in one or each of a plurality of pieces of aircraft information identified by the aircraft identification unit 122, and identifies the communication carrier corresponding to the acquired communication carrier information. Accordingly, the communication carrier that provides the communication service available to one or each of the plurality of flight apparatuses 3 that can fly by the user is identified. In addition, in a case in which the aircraft identification unit 122 identifies a plurality of flight apparatuses 3, the carrier identification unit 123 identifies the communication carrier for each of the plurality of flight apparatuses 3.

The determination unit 124 determines whether or not the flight apparatus 3 can perform communication using the communication service provided by the communication carrier during the flight on the flight path or in the flight range on the basis of the communication carrier identified by the carrier identification unit 123 and the flight path or the flight range included in the flight schedule information.

For example, the determination unit 124 acquires the communication area information that is stored in advance in the storage unit 11 and indicates the communication area of the communication carrier identified by the carrier identification unit 123. The determination unit 124 determines that the flight apparatus 3 can fly on the flight path or in the flight range in a case in which the flight path or the flight range is included in the communication area on the basis of the acquired communication area information and determines that the flight apparatus 3 cannot fly on the flight path or in the flight range in a case in which the flight path or the flight range is not included in the communication area on the basis of the acquired communication area information.

In addition, in a case in which the aircraft identification unit 122 identifies a plurality of flight apparatuses 3, the determination unit 124, for each of the plurality of flight apparatuses 3, determines whether or not the flight apparatus 3 can perform communication during the flight on the flight path or in the flight range on the basis of the communication carrier identified by the carrier identification unit 123 and the flight path or the flight range. In addition, in a case in which the carrier identification unit 123 identifies a plurality of communication carriers, the determination unit 124, for each of the plurality of communication carriers, determines whether or not the flight apparatus 3 can perform communication during the flight on the flight path or in the flight range on the basis of the communication carriers and the flight path or the flight range.

Figure 5A:
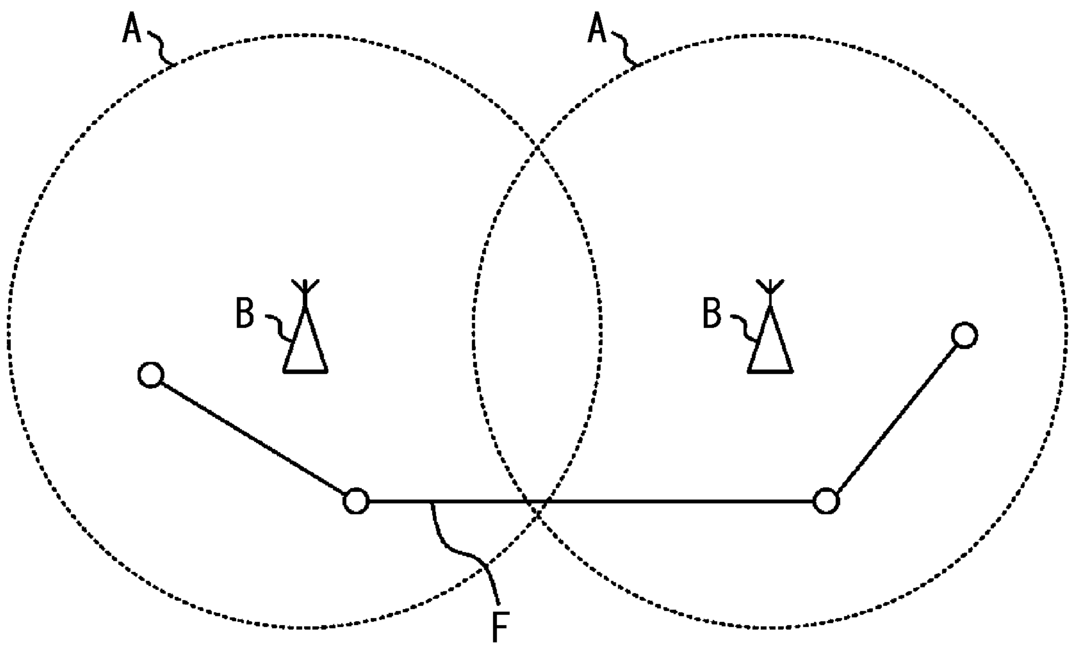
FIG. 5A and FIG. 5B are schematic diagrams for describing a method for determining, by a determination unit, whether or not a flight apparatus can perform communication on the basis of a communication carrier.
Figure 5B:
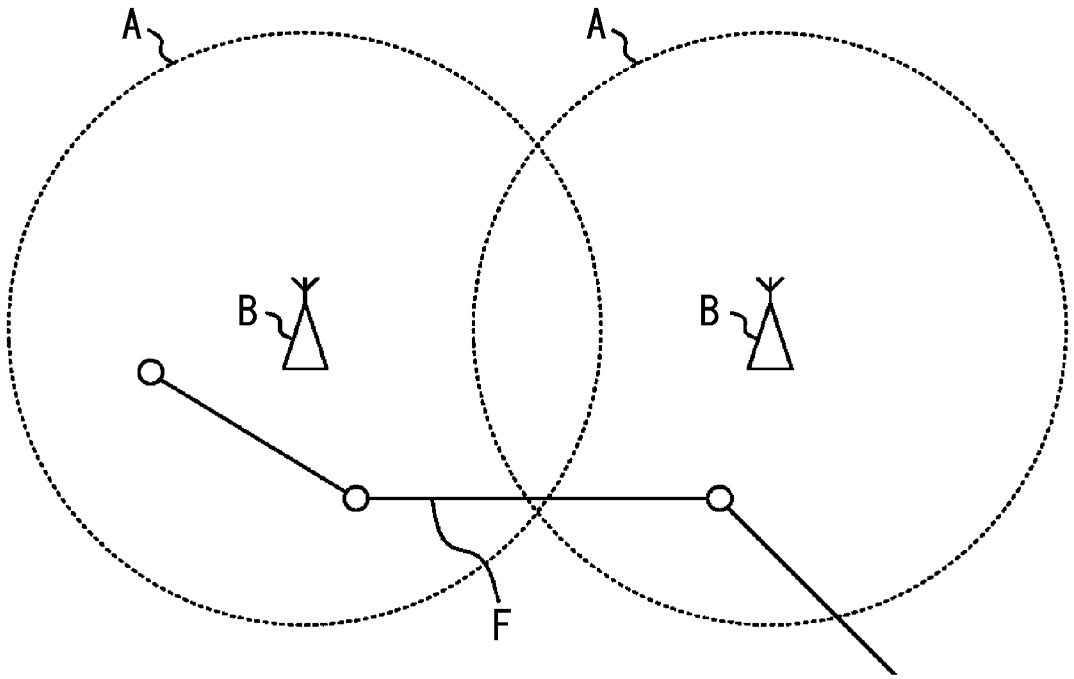

FIG. 5A and FIG. 5B are schematic diagrams for describing a method for determining, by the determination unit 124, whether or not the flight apparatus 3 can perform communication on the basis of the communication carrier. FIG. 5A and FIG. 5B represent a base station B for providing the communication service of the communication carrier identified by the carrier identification unit 123 and a communication area A in which communication with the base station B can be performed.

In the example in FIG. 5A, because the entire flight path F is included in the communication area A, the determination unit 124 determines that the flight apparatus 3 can fly on the flight path F. On the other hand, in the example in FIG. 5B, because at least part of the flight path F is not included in the communication area A, the determination unit 124 determines that the flight apparatus 3 cannot fly on the flight path F. While the determination of the flight path F is represented in the examples in FIG. 5A and FIG. 5B, the determination unit 124 performs a determination similar to that for the flight range R. Accordingly, the flight management apparatus 1 can determine whether or not the flight apparatus 3 can perform communication during the flight using the communication service of the communication carrier.

In addition, the determination unit 124 may determine whether or not the flight apparatus 3 can perform communication on the basis of the value (e.g., the SNR or the intensity of radio waves) that indicates the communication quality. In this case, the determination unit 124 estimates the value indicating the communication quality at each point on the basis of a relationship between each point of the flight path or the flight range and a position of the base station. Then, in a case in which the estimated communication quality is a predetermined reference value or less in at least part of the flight path or the flight range (a case in which the radio waves are weak, a case in which there is interference of the radio waves, or the like), the determination unit 124 determines that communication cannot be performed; otherwise, the determination unit 124 determines that communication can be performed.

In a case in which the determination unit 124 determines that the flight apparatus 3 cannot fly on the flight path or in the flight range using the communication service provided by one communication carrier, the determination unit 124 may determine whether or not the flight apparatus 3 can perform communication during the flight on the flight path or in the flight range on the basis of a combination of two or more communication carriers among the plurality of communication carriers identified by the carrier identification unit 123 and the flight path or the flight range.

In this case, the determination unit 124 determines that the flight apparatus 3 can fly on the flight path or in the flight range in a case in which the flight path or the flight range is included in a combination of the communication areas of the plurality of communication carriers, and determines that the flight apparatus 3 cannot fly on the flight path or in the flight range in a case in which the flight path or the flight range is not included in the combination.

Figure 6:
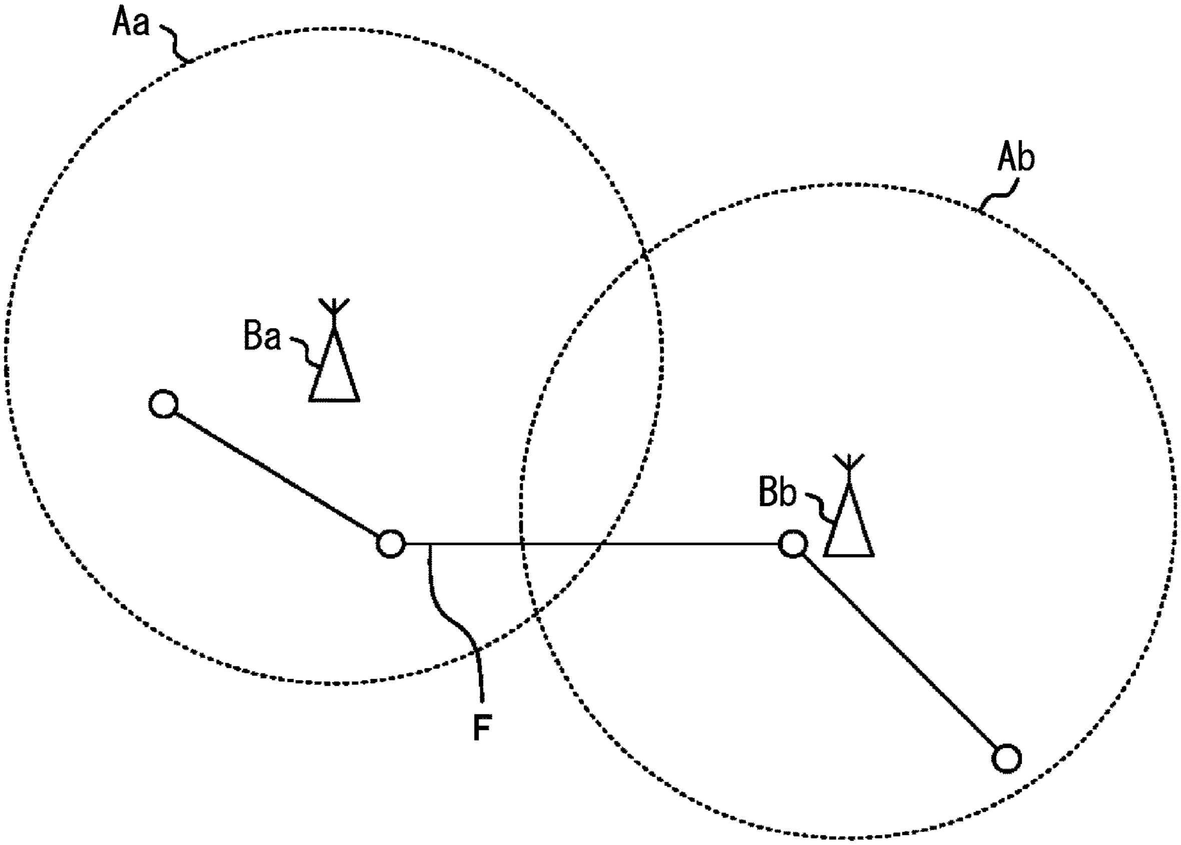
FIG. 6 is a schematic diagram for describing a method for determining, by the determination unit, whether or not the flight apparatus can perform communication on the basis of a combination of a plurality of communication carriers.

FIG. 6 is a schematic diagram for describing a method for determining, by the determination unit 124, whether or not the flight apparatus 3 can perform communication on the basis of the combination of the plurality of communication carriers. FIG. 6 represents a base station Ba for providing a communication service of a first communication carrier and a communication area Aa in which communication with the base station Ba can be performed. In addition, FIG. 6 represents a base station Bb for providing a communication service of a second communication carrier and a communication area Ab in which communication with the base station Bb can be performed.

In the example in FIG. 6, because the entire flight path F is included in a combination of the communication area Aa and the communication area Ab of a plurality of communication carriers, the determination unit 124 determines that the flight apparatus 3 can fly on the flight path F. While the determination of the flight path F is represented in the example in FIG. 6, the determination unit 124 performs a determination similar to that for the flight range R. Accordingly, the flight management apparatus 1 can determine whether or not the flight apparatus 3 can perform communication during the flight using a combination of the communication services of the plurality of communication carriers.

In addition, the determination unit 124 may determine whether or not the flight apparatus 3 can perform communication during the flight on the flight path or in the flight range on the basis of the work content to be performed by the flight apparatus 3 in addition to the communication carrier identified by the carrier identification unit 123 and the flight path or the flight range included in the flight schedule information. In this case, the determination unit 124 acquires a determination condition that corresponds to the work content included in the flight schedule information. For example, the determination condition is a range of the value of the communication quality (intensity of radio waves) necessary for the work. In addition, the determination condition may indicate different ranges of the value of the communication quality for each location on the flight path or in the flight range. For example, the determination condition is such that a higher range of the communication quality is required in a location in which the predetermined work is performed, than in other locations. Accordingly, for example, in a work such as inspection of a specific location, the flight apparatus 3 can transmit data such as a captured image while performing communication without interruption and more securely perform the work.

For example, the determination unit 124 estimates the communication quality on the flight path or in the flight range on the basis of a distance from the base station and determines that the flight apparatus 3 can fly on the flight path or in the flight range on a condition that the estimated communication quality satisfies the determination condition. Accordingly, the flight management apparatus 1 can determine whether or not the flight apparatus 3 can fly while considering the work content of the flight apparatus 3.

In addition, the determination unit 124 may select any communication carrier from among the plurality of communication carriers on the basis of the communication quality necessary for the work and select the aircraft of the flight apparatus 3 corresponding to the selected communication carrier. In this case, the determination unit 124 acquires the range of the value of the communication quality that is the determination condition corresponding to one or each of a plurality of work contents included in the flight schedule information. The determination unit 124 compares the range of the value of the communication quality corresponding to one or each of the plurality of work contents with the value of the communication quality for each communication carrier included in the communication area information, and selects any communication carrier that satisfies the communication quality necessary for the work on the flight path or in the flight range. In a case in which the communication carrier that satisfies the communication quality necessary for the work is not present, the determination unit 124 may determine that the work content included in the flight schedule information cannot be executed on the flight path or in the flight range included in the flight schedule information.

Then, the determination unit 124 selects, from among the plurality of flight apparatuses 3 identified by the aircraft identification unit 122, the aircraft of the flight apparatus 3 that can perform communication using the communication service provided by the selected communication carrier. Accordingly, the flight management apparatus 1 can select the communication carrier and the aircraft appropriate for the work content and present them to the user terminal 2.

In addition, the determination unit 124 may determine whether or not the flight apparatus 3 can perform communication during the flight on the flight path or in the flight range on the basis of the number of flight apparatuses 3 flying in the same flight schedule period in addition to the communication carrier identified by the carrier identification unit 123 and the flight path or the flight range included in the flight schedule information. In this case, the determination unit 124 acquires reservation situations of the plurality of flight apparatuses 3 from the storage unit 11. The determination unit 124 extracts one or a plurality of base stations that cover each flight position on the basis of flight position information (i.e., positions extracted at predetermined intervals on the flight path or in the flight range) corresponding to the flight path or the flight range.

The determination unit 124 calculates the number of flight apparatuses 3 that fly in the same time zone as the flight schedule period while communicating with the extracted one or the plurality of base stations on the basis of the reservation situations of the plurality of flight apparatuses 3. Then, the determination unit 124 determines that the flight apparatus 3 can fly on the flight path or in the flight range on a condition that the calculated number is a predetermined value or less. Accordingly, the flight management apparatus 1 can restrict the number of flight apparatuses 3 that communicate with the base station at the same time.

The transmission unit 125 transmits the determination result of the determination unit 124 for the flight schedule information to the user terminal 2. For example, the determination result includes the aircraft information about the flight apparatus 3, the communication carrier used by the flight apparatus 3, and information that indicates whether or not the flight apparatus 3 can perform communication during the flight. In addition, in a case in which the user designates the number of aircrafts that is two or greater, the transmission unit 125 transmits, to the user terminal 2, the determination result including the aircraft information about a plurality of flight apparatuses 3 that correspond to the number of aircrafts included in the flight schedule information and that are determined to be able to fly on the flight path or in the flight range by the determination unit 124.

In addition, in a case in which the determination unit 124 determines that the flight apparatus 3 can fly on the flight path or in the flight range using the combination of the plurality of communication carriers, the transmission unit 125 transmits the determination result including the combination of the plurality of communication carriers to the user terminal 2. The user terminal 2 displays the determination result received from the flight management apparatus 1 on the display unit.

Accordingly, the user can refer to the determination result as to whether or not the flight apparatus 3 can perform communication during the flight on the flight path or in the flight range using the communication service of the communication carrier and then decide whether or not to actually cause the flight apparatus 3 to fly. Accordingly, the flight management apparatus 1 can cause the flight apparatus 3 to perform stable communication on the flight path or in the flight range designated by the user using the communication service provided by the communication carrier.

In a case in which it is determined that the flight apparatus 3 can fly on the flight path or in the flight range, the user terminal 2 transmits a reservation request for the flight of the flight apparatus 3 in accordance with the flight schedule information to the flight management apparatus 1 on a condition that a predetermined reservation operation is received from the user. In a case in which the flight management apparatus 1 identifies the plurality of flight apparatuses 3 or the plurality of communication carriers, the user terminal 2 may receive a selection of any of the flight apparatuses 3 or any of the communication carriers and transmit the reservation request indicating the selected flight apparatus 3 or the selected communication carrier.

In the flight management apparatus 1, the reception unit 121 receives the reservation request for the flight of the flight apparatus 3 in accordance with the flight schedule information from the user terminal 2. In a case in which the reception unit 121 receives the reservation request, the reservation management unit 126 stores, in the storage unit 11, the reservation information in which the flight schedule information designated by the user, the aircraft information about the flight apparatus 3, and the communication carrier information indicating the communication carrier providing the communication service to be used by the flight apparatus 3 are associated. In addition, the reservation management unit 126 may register the flight schedule information and the aircraft information corresponding to the reservation information in a database of the communication carrier. Accordingly, the flight management apparatus 1 can confirm that the flight apparatus 3 can perform communication using the communication carrier and then receive a reservation for the flight of the flight apparatus 3.

The transmission unit 125 transmits, on the basis of the reservation information stored in the storage unit 11, the flight information for the flight on the flight path or in the flight range to the flight apparatus 3 corresponding to the aircraft information included in the reservation information before a predetermined time period from the flight schedule period included in the reservation information. The flight apparatus 3 flies on the flight path or in the flight range in accordance with the received flight information and performs communication using the communication service of the communication carrier identified by the flight management apparatus 1.

In a case in which the flight apparatus 3 includes the eSIM, the transmission unit 125 may transmit the flight information for setting the eSIM to use the communication service of the communication carrier identified by the flight management apparatus 1 to the flight apparatus 3. The flight apparatus 3 can perform communication using the communication service of the communication carrier by setting the eSIM in accordance with the received flight information.

In addition, the transmission unit 125 may transmit the communication area information around the flight path or the flight range in which the flight apparatus 3 is flying or is scheduled to fly, to the flight apparatus 3 on a condition that a request for area information about the available communication carrier is received from the flight apparatus 3.

Sequence of Flight Management Method

Figure 7:
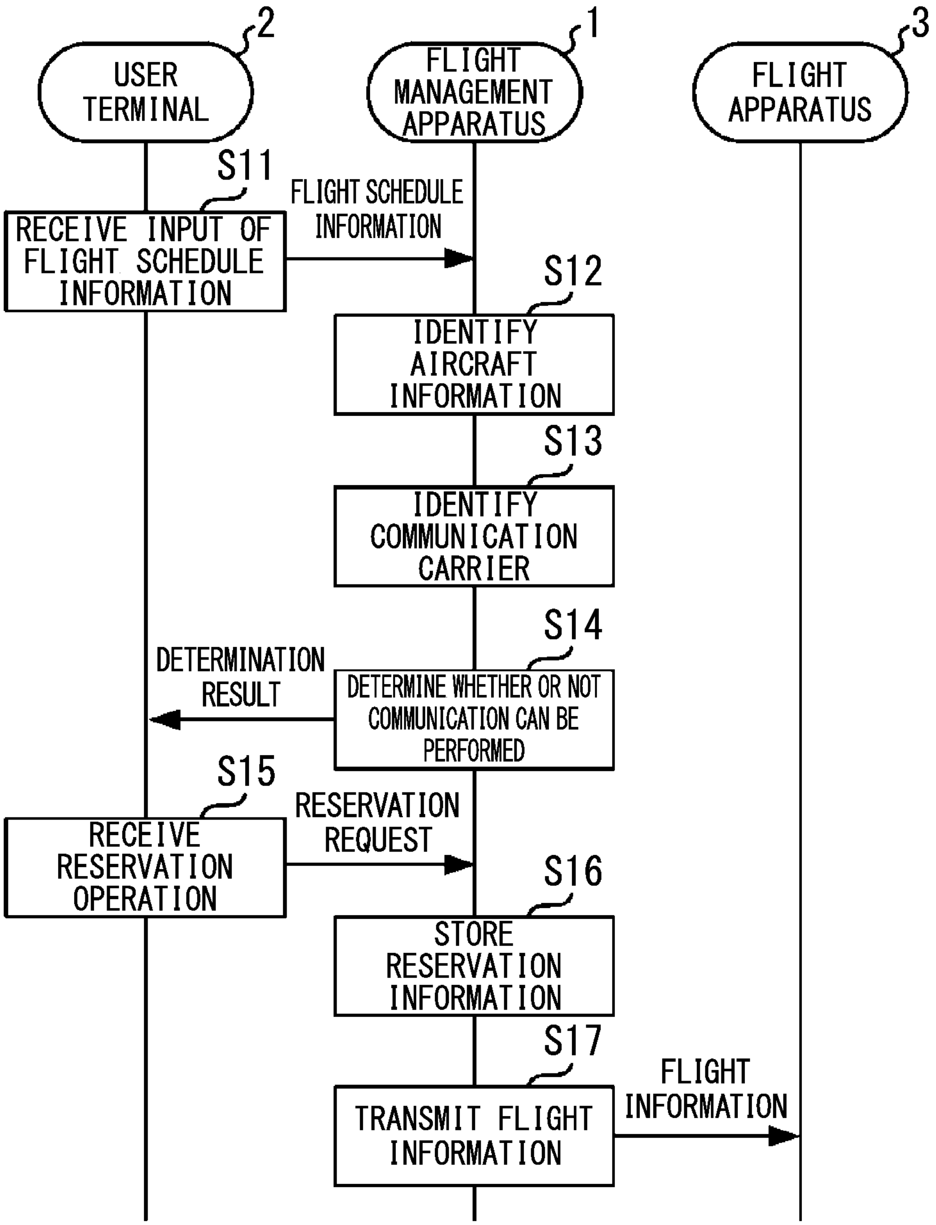
FIG. 7 is a diagram showing a sequence of a flight management method executed by the flight management system.

FIG. 7 is a diagram showing a sequence of a flight management method executed by the flight management system. The user terminal 2 receives the input of the flight schedule information on the flight schedule screen (S11). Specifically, first, the user terminal 2 receives a creation of the flight area that is the flyable region, on the map. The flight management apparatus 1 stores the created flight area in the storage unit 11 as the flight range in association with the user identification information for identifying the user of the user terminal 2. Then, the user terminal 2 receives a designation of the flight path in the flight range.

In the flight management apparatus 1, the reception unit 121 receives, from the user terminal 2, the flight schedule information including the user identification information for identifying the user, the flight path or the flight range in which the flight apparatus 3 is scheduled to fly, and the flight schedule period in which the flight apparatus 3 is scheduled to fly on the flight path or in the flight range.

The aircraft identification unit 122 identifies, from the aircraft information stored in the storage unit 11, one or the plurality of pieces of aircraft information associated with the user ID included in the flight schedule information received by the reception unit 121 (S12). The carrier identification unit 123 acquires, from the communication carrier information stored in the storage unit 11, the communication carrier information that is associated with the SIM information included in one or each of the plurality of pieces of aircraft information identified by the aircraft identification unit 122, and identifies the communication carrier corresponding to the acquired communication carrier information (S13).

The determination unit 124 determines whether or not the flight apparatus 3 can perform communication using the communication service provided by the communication carrier during the flight on the flight path or in the flight range on the basis of the communication carrier identified by the carrier identification unit 123 and the flight path or the flight range included in the flight schedule information (S14). The determination unit 124 determines that the flight apparatus 3 can fly on the flight path or in the flight range in a case in which the flight path or the flight range is included in the communication area on the basis of the communication area information stored in advance in the storage unit 11, and determines that the flight apparatus 3 cannot fly on the flight path or in the flight range in a case in which the flight path or the flight range is not included in the communication area on the basis of the communication area information stored in advance in the storage unit 11.

The transmission unit 125 transmits the determination result of the determination unit 124 for the flight schedule information to the user terminal 2. The user terminal 2 displays the determination result received from the flight management apparatus 1 on the display unit. In a case in which it is determined that the flight apparatus 3 can fly on the flight path or in the flight range, the user terminal 2 receives the predetermined reservation operation from the user (S15). The user terminal 2 transmits the reservation request for the flight of the flight apparatus 3 in accordance with the flight schedule information to the flight management apparatus 1 on a condition that the reservation operation is received.

In the flight management apparatus 1, the reception unit 121 receives the reservation request for the flight of the flight apparatus 3 in accordance with the flight schedule information from the user terminal 2. In a case in which the reception unit 121 receives the reservation request, the reservation management unit 126 stores, in the storage unit 11, the reservation information in which the flight schedule information designated by the user, the aircraft information about the flight apparatus 3, and the communication carrier information indicating the communication carrier providing the communication service to be used by the flight apparatus 3 are associated (S16). In addition, the reservation management unit 126 may register the flight schedule information and the aircraft information corresponding to the reservation information in the database of the communication carrier.

The transmission unit 125 transmits the flight information for the flight on the flight path or in the flight range to the flight apparatus 3 corresponding to the aircraft information included in the reservation information before the predetermined time period from the flight schedule period included in the reservation information on the basis of the reservation information stored in the storage unit 11 (S17). The flight apparatus 3 flies on the flight path or in the flight range in accordance with the received flight information and performs communication using the communication service of the communication carrier identified by the flight management apparatus 1.

Advantageous Effects of Embodiment

The flight management apparatus 1 according to the present embodiment identifies the communication carrier that provides the communication service available to the flight apparatus 3, determines whether or not the flight apparatus 3 can fly on the flight path or in the flight range using the communication service of the communication carrier, and transmits the determination result to the user terminal 2. The user can refer to the determination result in the user terminal 2 and then decide whether or not to actually cause the flight apparatus 3 to fly. Accordingly, the flight management apparatus 1 can cause the flight apparatus 3 to perform stable communication on the flight path or in the flight range designated by the user using the communication service provided by the communication carrier.

Accordingly, for example, an environment in which the drone can fly can be created even in an urban area, a mountainous area, and the like covered by a wireless network, and thus a contribution can be made to Goal 9 "Industry, Innovation and Infrastructure" and Goal 10 "Reduced Inequalities" of Sustainable Development Goals (SDGs) led by the United Nations.

First Modification Example

In the above-described embodiment, the flight management apparatus 1 performs the determination for one flight path or one flight range received from the user terminal 2. In contrast, in the present modification example, the determination is performed for a plurality of flight paths or flight ranges received from the user terminal 2. Hereinafter, differences from the above-described embodiment will be mainly described.

In the present modification example, the user terminal 2 receives an input of a plurality of flight paths or flight ranges on the flight schedule screen shown in FIG. 3. In addition, the user terminal 2 receives an input of the number of aircrafts, the work content, and the flight schedule period for each of the plurality of flight paths or flight ranges. The user terminal may receive an input of the number of aircrafts, the work content, and the flight schedule period that are common to the plurality of flight paths or flight ranges.

In the flight management apparatus 1, the reception unit 121 receives the flight schedule information including the plurality of flight paths or flight ranges from the user terminal 2. For each of the plurality of flight paths or flight ranges included in the flight schedule information, the determination unit 124 determines whether or not the flight apparatus 3 can perform communication during the flight on the flight path or in the flight range using the communication service provided by the communication carrier on the basis of the communication carrier identified by the carrier identification unit 123. Accordingly, the flight apparatus 3 that can perform communication during the flight on the flight path or in the flight range using the communication service provided by the communication carrier is extracted for each of the plurality of flight paths or flight ranges.

The transmission unit 125 transmits, to the user terminal 2, the aircraft information about the flight apparatus 3 that is determined to be able to fly on the flight path or in the flight range by the determination unit 124 for each of the plurality of flight paths or flight ranges. The user terminal 2 displays, on the display unit, the aircraft information about the flight apparatus 3 that is determined to be able to fly on the flight path or in the flight range by the determination unit 124, in association with each of the plurality of flight paths or flight ranges.

Accordingly, because the flight management apparatus 1 can extract the flight apparatus 3 that can perform communication during the flight on each of the plurality of flight paths or in each of the flight ranges, and present the flight apparatus 3 to the user, an effort of the user for causing the plurality of flight apparatuses 3 to fly on the plurality of flight paths or in the plurality flight ranges can be reduced.

While the present invention is described above using the embodiment, the technical scope of the present invention is not limited to the scope disclosed in the embodiment, and various modifications and changes can be made within the scope of the gist of the present invention. For example, the entirety or part of an apparatus can be configured by functional or physical distribution or integration in any units. In addition, the embodiment of the present invention includes a new embodiment that results from any combination of a plurality of embodiments. An advantageous effect of the new embodiment resulting from the combination also has the advantageous effect of the original embodiment.

Processors of the flight management apparatus 1, the user terminal 2, and the flight apparatus 3 are subjects of each step (process) included in the flight management method shown in FIG. 7. That is, the processors of the flight management apparatus 1, the user terminal 2, and the flight apparatus 3 execute the flight management method shown in FIG. 7 by reading a program for executing the flight management method shown in FIG. 7 from a storage unit and executing the program. Some of the steps included in the flight management method shown in FIG. 7 may be omitted, the order of the steps may be changed, and a plurality of steps may be performed in parallel.

What is claimed is:

1. A flight management apparatus comprising:

at least one memory configured to store instructions; and at least one processor configured to execute the instructions, wherein the at least one processor is configured to execute the instructions to receive, from a user terminal used by a user, flight schedule information including user identification information for identifying the user, a flight path or a flight range in which a flight apparatus is scheduled to fly, and a flight schedule period in which the flight apparatus is scheduled to fly on the flight path or in the flight range;

identify aircraft information that includes SIM (Subscriber Identity Module) information indicating a SIM provided in the flight apparatus associated with the user identification information;

identify one or more communication carriers that provides a communication service available to the flight apparatus based on the SIM information of the identified aircraft information;

determine whether or not the flight apparatus is communicable during flight on the flight path or in the flight range using the communication service on the basis of the one or more communication carriers and the flight path or the flight range; and transmit a determination result of the determination to the user terminal;

determine, in a case in which the SIM information indicates an embedded-SIM and a plurality of communication carriers are identified, whether or not the flight path or the flight range is included in a combination of communication areas of the communication services of the plurality of communication carriers, and to determine that the flight apparatus is flyable on the flight path or in the flight range in a case in which the flight path or the flight range is included in the combination of communication areas; and control the flight apparatus equipped with the embedded-SIM corresponding to the identified aircraft information to change the communication service provided by a communication carrier available to the flight apparatus and to perform communication using the changed communication service, by transmitting to the flight apparatus flight information for setting the embedded-SIM.

2. The flight management apparatus according to claim 1, wherein the at least one processor is configured to execute the instructions to:

receive a reservation request for flight of the flight apparatus in accordance with the flight schedule information from the user terminal, and associate and store, in a case in which the reservation request is received, the flight schedule information, the aircraft information, and communication carrier information indicating the communication carrier in the at least one memory.

3. The flight management apparatus according to claim 1, wherein the at least one processor is configured to execute the instructions to determine, in a case in which a plurality of communication carriers are identified, whether or not the flight apparatus is communicable during the flight on the flight path or in the flight range for each of the plurality of communication carriers on the basis of the communication carrier and the flight path or the flight range.

4. The flight management apparatus according to claim 1, wherein the at least one processor is configured to execute the instructions to:

determine that the flight apparatus is not flyable on the flight path or in the flight range in a case in which the at least part of the flight path or the flight range is not included in the combination of communication areas.

5. The flight management apparatus according to claim 1, wherein the at least one processor is configured to execute the instructions to:

receive, from the user terminal, the flight schedule information including the number of aircrafts of a plurality of the flight apparatuses that are scheduled to fly on the flight path or in the flight range, and transmit, to the user terminal, the aircraft information about a plurality of the flight apparatuses that correspond to the number of the aircrafts and that are determined to be flyable on the flight path or in the flight range.

6. The flight management apparatus according to claim 1, wherein the at least one processor is configured to execute the instructions to:

receive the flight schedule information including a plurality of flight paths or a plurality of flight ranges from the user terminal, and transmit, to the user terminal, the aircraft information about the flight apparatus that is determined to be flyable on the flight path or in the flight range for each of the plurality of flight paths or the plurality of flight ranges.

7. The flight management apparatus according to claim 1, wherein the at least one processor is configured to execute the instructions to:

receive, from the user terminal, the flight schedule information including a work content to be performed on the flight path or in the flight range by the flight apparatus, and determine whether or not the flight apparatus is communicable during the flight on the flight path or in the flight range on the basis of the work content in addition to the communication carrier and the flight path or the flight range.

8. The flight management apparatus according to claim 1, wherein the at least one processor is configured to execute the instructions to:

extract one or more base stations which provide the communication service of the identified communication carrier and cover each of the flight positions corresponding to the flight path or the flight range; and determine that the flight apparatus is communicable using the communication service in a case in which a number of the flight apparatuses flying in communication with the extracted one or more base stations during the flight schedule period is less than a predetermined value.

9. The flight management apparatus according to claim 1, wherein the at least one memory stores communication area information including communication quality at each position of the one or more communication carriers that provide communication services that can be used by the flight apparatus, the flight schedule information includes one or more work contents to be performed on the flight path or in the flight range, the at least one processor is configured to execute the instructions to:

identify the aircraft information related to a plurality of flight apparatuses associated with the user identification information;

identify the one or more communication carriers that provides the communication service available to the plurality of flight apparatuses based on the identified aircraft information;

compare, in a case in which the plurality of communication carriers are identified, a range of communication quality corresponding to each of the one or more work contents to be performed on the flight path or in the flight range included in the flight schedule information with the communication quality for each communication carrier included in the communication area information;

select, from among the plurality of communication carriers that are identified, the communication carrier that satisfies the communication quality corresponding to the one or more work contents performed on the flight path or in the flight range; and select, from among the plurality of flight apparatuses that are identified, the flight apparatus that uses the communication service provided by the selected communication carrier.

10. The flight management apparatus according to claim 1, wherein in controlling the flight apparatus, the at least one processor is configured to control the flight apparatus to perform a setting process to change the communication service among the plurality of communication carriers that are identified.

11. A flight management method executed by a processor, the method comprising:

receiving, from a user terminal used by a user, flight schedule information including user identification information for identifying the user, a flight path or a flight range in which a flight apparatus is scheduled to fly, and a flight schedule period in which the flight apparatus is scheduled to fly on the flight path or in the flight range;

identifying aircraft information that includes SIM (Subscriber Identity Module) information indicating a SIM provided in the flight apparatus associated with the user identification information;

identifying one or more communication carriers that provides a communication service available to the flight apparatus based on the SIM information of the identified aircraft information;

determining whether or not the flight apparatus is communicable during flight on the flight path or in the flight range using the communication service on the basis of the one or more communication carriers and the flight path or the flight range; and transmitting a result of the determination to the user terminal, wherein the determining includes determining, in a case in which the SIM information indicates an embedded-SIM and a plurality of communication carriers are identified, whether or not the flight path or the flight range is included in a combination of communication areas of the communication services of the plurality of communication carriers, and determining that the flight apparatus is flyable on the flight path or in the flight range in a case in which the flight path or the flight range is included in the combination of communication areas, and wherein the method further comprises controlling the flight apparatus equipped with the embedded-SIM corresponding to the identified aircraft information to change the communication service provided by a communication carrier available to the flight apparatus and to perform communication using the changed communication service, by transmitting to the flight apparatus flight information for setting the embedded-SIM.

12. The flight management method according to claim 11, wherein controlling the flight apparatus comprises:

controlling the flight apparatus to perform a setting process to change the communication service among the plurality of communication carriers that are identified.

* * * * *